H. W. WEEKS.
DOWEL SAWING MACHINE.
APPLICATION FILED SEPT. 26, 1914.
1,168,923.
Patented Jan. 18, 1916.
2 SHEETS—SHEET 1.
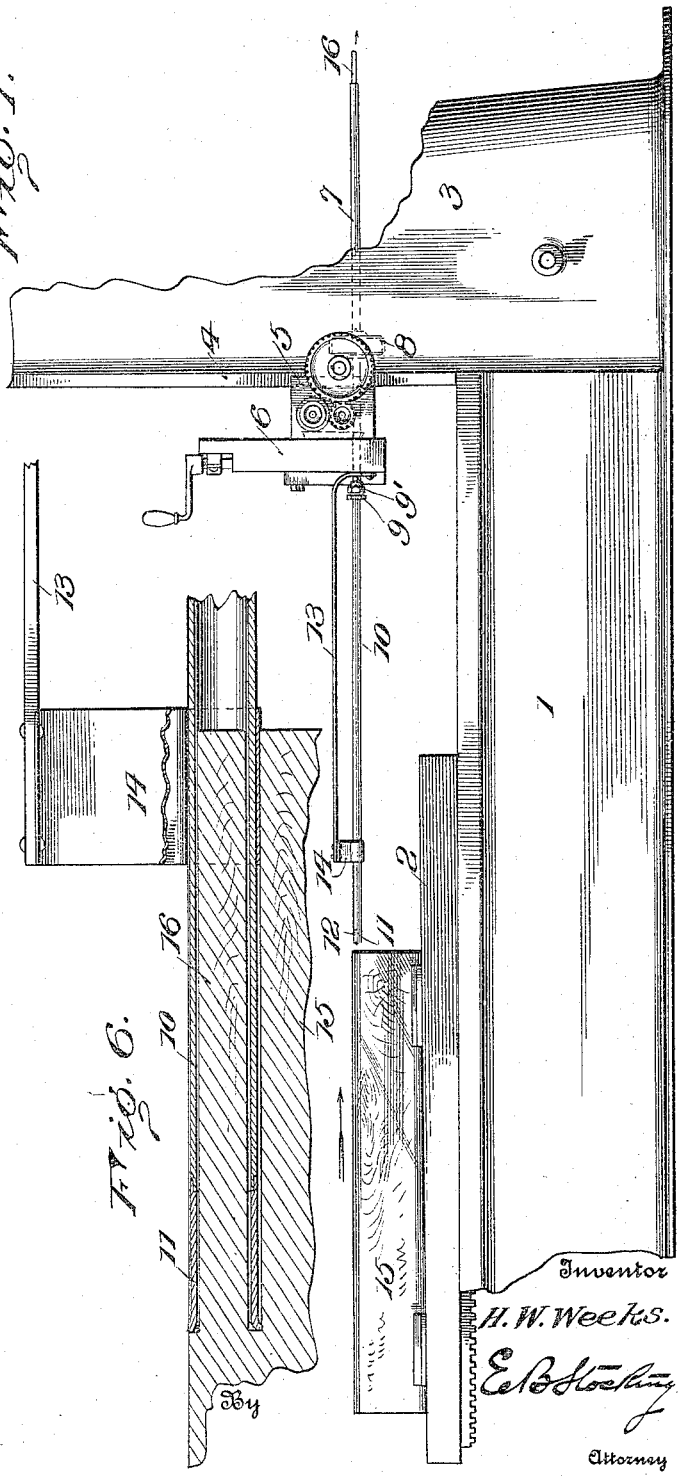
Witnesses
W. A. Williams
A. Albright
Inventor
H. W. Weeks.
By E. B. Stocking
Attorney

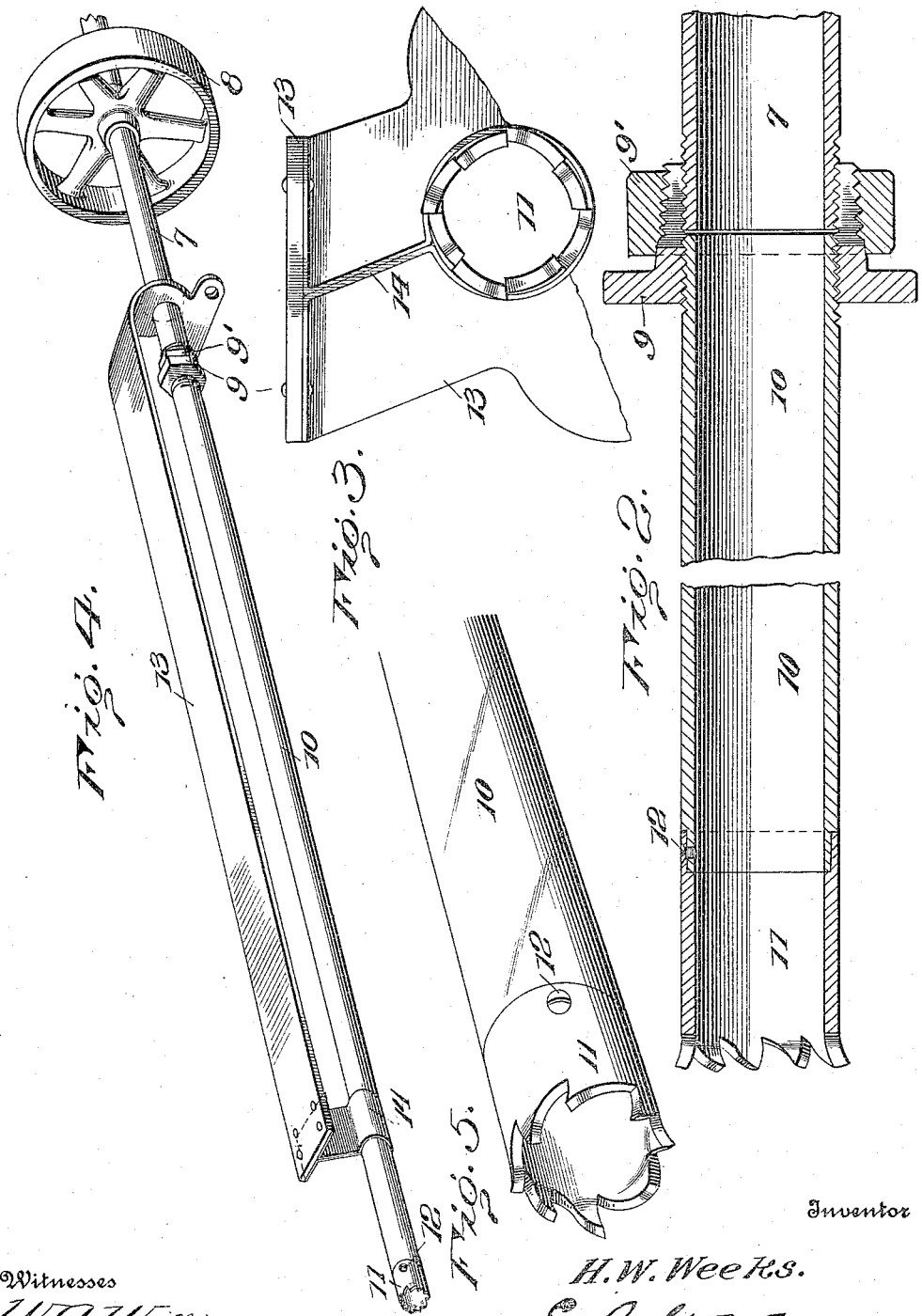

UNITED STATES PATENT OFFICE.

HERBERT W. WEEKS, OF COOPERS MILLS, MAINE.

DOWEL-SAWING MACHINE.

1,168,923.    Specification of Letters Patent.    Patented Jan. 18, 1916.

Application filed September 26, 1914. Serial No. 863,625.

*To all whom it may concern:*

Be it known that I, HERBERT W. WEEKS, a citizen of the United States of America, residing at Coopers Mills, in the county of Lincoln and State of Maine, have invented certain new and useful Improvements in Dowel-Sawing Machines, of which the following is a specification, reference being had therein to the accompanying drawing.

This invention relates to certain new and useful improvements in dowel sawing machines, the object being to provide a sawing machine by means of which, a greater number of dowel sticks can be sawed from a log than with machines of this character, now in use.

Another object of the invention is to provide a dowel sawing machine in which a reciprocating table is employed upon which the log is mounted which is adapted to be brought into engagement with a rotary tubular saw mounted for vertical and horizontal adjustment so that the position of the tubular saw can be changed in respect to the log, whereby a series of dowel sticks can be cut transversely from the log.

Another object of the invention is to provide novel means for supporting the outer end of the saw in such a manner that the same will be held in true horizontal position; said supporting means being so constructed that it does not interfere with the operation of the tubular saw, in any way.

Another and further object of the invention is to provide a tubular saw with a detachable cutting edge having suitably formed teeth which are set at such an angle that the sawdust will not interfere with the operation of the saw; the strips intermediate the portions forming the dowel being thrown to one side.

Other and further objects and advantages of the invention will be hereinafter set forth and the novel features thereof defined by the appended claims.

In the drawings—Figure 1, is a side elevation of my improved construction of dowel sawing machine, showing a log in position to be cut into dowel sticks; Fig. 2, is a longitudinal vertical section through my improved construction of tubular saw; Fig. 3, is an end view of the same showing the supporting bearing; Fig. 4, is a perspective of the tubular saw showing the means for supporting the same; Fig. 5, is a detail perspective of the cutting edge of the tubular saw; Fig. 6, is a detail section showing the saw in position when cutting a dowel stick from the log; and Fig. 7, is an end view of a log showing, by circles designated from 1 to 79, the number of dowel sticks which can be cut from a log.

Like numerals of reference refer to like parts in the several figures of the drawings.

In the drawings, 1 indicates a suitable bed on which is mounted to reciprocate, a table 2 which is adapted to be operated by any of the well-known forms of table-operating means now in use so as to reciprocate the carriage back and forth in respect to the tubular saw, as will be later described.

The bed 1 is provided with a standard or frame 3 at one end having suitable guide-ways 4 on which is mounted a carriage 5 in order to allow the carriage to be adjusted vertically, said carriage having suitable guide-ways formed thereon on which is transversely adjustably mounted, a head 6, said head having a tubular arbor 7 mounted therein provided with a drive pulley 8, by means of which, the same is rotated.

Connected to the outer end of the tubular arbor by a coupling 9, is a tubular saw 10 which is provided with a detachable cutting edge 11 having saw teeth formed therein in the ordinary manner, said cutting edge being herein shown secured in position upon the tubular saw 10 by screws 12, the outer end of the tubular saw being reduced to receive the reduced portion of the cutting edge, which is clearly shown in Fig. 2, but, it is of course understood, that the overlapping reduced portions of the cutting edge and saw can be formed with threads in order to secure the detachable cutting edge to the saw proper and I do not wish to limit myself to any detailed construction in connecting the cutting edge to the saw proper, as various other forms could be adopted without departing from the spirit of my invention.

The coupling member 9 herein shown, is in the form of a split nut into which the respective ends of the arbor and tubular saw extend which is contracted by a nut 9', but it is, of course, understood that other forms of coupling member could be employed without departing from the spirit of my invention.

The object of providing a coupling member at this point is to allow the saw to be detached so that a saw having a different diameter can be substituted therefor so that dowel sticks of various sizes can be cut on the same machine.

In order to provide means for supporting the tubular saw adjacent its outer end, I secure to the head 6 an arm 13 provided with an opening to receive the tubular arbor 7 and extends forwardly as clearly shown in Figs. 1 and 4 and is provided with an obliquely arranged depending bearing 14 through which the outer portion of the tubular saw extends and is mounted to revolve.

In the operation of my improved construction of sawing machine, a log 15 is secured in position upon the table 2 and the tubular saw is adjusted through the medium of the carriage and head, until it is in position to engage the end of the log at a point adjacent the left edge thereof corresponding to the circle marked 1 in Fig. 7. The tubular saw is then revolved and at the same time, the carriage is fed toward the standard and the dowel stick 16 is cut from the log.

After the saw has completely passed through the log lengthwise, the table is returned to its initial position and the saw is adjusted so as to bring the cutting edge thereof into position to engage the log at a point designated by the numeral 2 in Fig. 7, and the operation is repeated. It will be seen that the thickness of the tubular saw allows the saw to be adjusted so as to bring the circumference thereof flush with the face of the log so as to allow the bearing 14 to pass through the slot formed thereby, the sawdust passing out through said slot, the strips between the circles in Fig. 7, dropping off to the left as the saw is advanced transversely across the log. When a series of dowel sticks have been cut from the log they will force one another out through the open end of the tubular arbor 7 as shown in Fig. 1 and which can be deposited into a suitable receptacle.

From the foregoing description, it will be seen that I have provided a tubular sawing machine which is capable of cutting a great number of dowel sticks from a log and while I have shown a log with its upper and lower faces flattened it is, of course, understood that it is only necessary to flatten the lower face of the log so that the same will be held in a rigid position upon the table in order to bring the saw into engagemnt with the end thereof to make a longitudinal cut therethrough.

It will also be seen that by supporting the tubular saw adjacent its end in the manner set forth, the strips between the dowels being cut are allowed to drop off of the log out of the way of the saw as the same eats its way through the log.

While I have not shown and described any particular manner of operating the saw table and carriage, it is, of course, understood that any of the well-known forms of operating means now in use can be employed by means of which, the carriage will be advanced after each cut has been made in the log.

I claim:

1. In a dowel sawing machine, the combination with a carriage provided with a head, of a tubular arbor mounted in said head, a tubular saw connected to said arbor, an arm secured to said head in a plane below said arbor extending upwardly and outwardly and provided with an opening to receive said arbor, and an obliquely arranged depending bearing carried by the free end of said arm for supporting said saw.

2. In a dowel sawing machine, the combination with a tubular saw, of an arm extending above said saw, and a depending obliquely arranged bearing carried by said arm through which said saw extends.

3. In a dowel sawing machine, the combination with a movable table, of a movable carriage provided with a tubular arbor, a tubular saw connected to said arbor, a supporting arm extending in a plane above said saw, and a depending obliquely arranged bearing carried by said arm through which said saw extends.

4. In a sawing machine, the combination with a reciprocating table, of a movable carriage mounted at one end of said table, a tubular arbor carried by said carriage, a tubular saw connected to said arbor, an arm extending in a plane above said tubular saw, and a depending obliquely arranged bearing carried by said arm through which said saw extends.

5. In a dowel sawing machine, the combination with a movable carriage provided with a head, of a tubular arbor mounted in said head, a tubular saw connected to the free end of said arbor, an arm having a depending angled end secured to said head, the angled portion of said arm being provided with an opening to receive said arbor, said arm extending parallel to said arbor in a plane above the same, and a bearing secured to said arm at its free end and extending obliquely downward therefrom, forming a support for said arbor.

In testimony whereof I hereunto affix my signature in the presence of two witnesses.

HERBERT W. WEEKS.

Witnesses:
J. E. ODIORNE,
S. A. WEEKS.